United States Patent [19]

Shaar et al.

[11] Patent Number: 5,140,167

[45] Date of Patent: Aug. 18, 1992

[54] METHOD AND APPARATUS FOR DETERMINING CLEAVE END ANGLE OF AN OPTICAL FIBER

[75] Inventors: Casey S. Shaar, Portland, Oreg.; Thomas A. Hanson, Corning, N.Y.

[73] Assignees: Photon Kinetics, Inc., Beaverton, Oreg.; Corning Incorporated, Corning, N.Y.

[21] Appl. No.: 614,193

[22] Filed: Nov. 14, 1990

[51] Int. Cl.[5] .................. G01N 21/86; G01C 3/08
[52] U.S. Cl. ...................... 250/561; 356/376
[58] Field of Search .......... 250/201.2, 561, 227.2, 250/227.26, 227.3; 356/376, 152, 240; 350/96.2

[56] References Cited

U.S. PATENT DOCUMENTS

| | | | |
|---|---|---|---|
| 4,092,068 | 5/1978 | Lucas et al. | 356/376 |
| 4,571,084 | 2/1986 | Wright | 356/376 |
| 4,629,324 | 12/1986 | Stern | 356/376 |
| 4,640,620 | 2/1987 | Schmidt | 356/376 |
| 4,657,393 | 4/1987 | Stern | 356/376 |
| 4,743,771 | 10/1988 | Sacks et al. | 356/376 |
| 4,920,273 | 4/1990 | Sacks et al. | 356/376 |

*Primary Examiner*—David C. Nelms
*Assistant Examiner*—John R. Lee
*Attorney, Agent, or Firm*—Dellett, Smith-Hill and Bedell

[57] ABSTRACT

A method of testing a length section of optical fiber in order to determine whether the angle between an end face of the length section and a plane perpendicular to a longitudinal axis of the length section of optical fiber is within a predetermined range, comprises positioning the length section of optical fiber so that its longitudinal axis substantially coincides with the optical axis of a camera, selecting at least two test regions on the end face of the fiber, adjusting the position of at least one of a camera, a lens and the length section of optical fiber to focus each of the test regions on the sensing surface of the camera, and comparing the adjustments performed in the preceding step for the two test regions respectively.

18 Claims, 2 Drawing Sheets

METHOD AND APPARATUS FOR DETERMINING CLEAVE END ANGLE OF AN OPTICAL FIBER

BACKGROUND OF THE INVENTION

This invention relates to a method and apparatus for determining cleave end angle of an optical fiber.

Quality control is very important in manufacture of optical fiber. Factors that have a bearing on quality of an optical fiber include the roundness of the fiber, the size of the fiber and whether the core is centered within the cladding.

Roundness, diameter and centering may be determined by examining an end face of the fiber. However, if the end face of the fiber is not perpendicular to the longitudinal axis of the fiber, the accuracy of the measurements of roundness, diameter and centering may be impaired. Therefore, it is desirable to measure the angle between the end face of the fiber and a plane perpendicular to the longitudinal axis of the fiber (the cleave end angle) before carrying out other measurements, and to recleave the fiber and provide another end face if the angle is not sufficiently close to 90°. One method of measuring the cleave end angle of an optical fiber involves use of a Mach-Zehnder interferometer, which is not otherwise used in determining roundness, diameter and centering. It is expensive and inconvenient to have to employ a dedicated machine for measuring cleave end angle.

SUMMARY OF THE INVENTION

In accordance with a first aspect of the present invention, a method of testing a length section of optical fiber in order to determine whether the angle between an end face of the length section and a plane perpendicular to a longitudinal axis of the length section of optical fiber is within a predetermined range, comprises positioning the length section of optical fiber so that its longitudinal axis substantially coincides with the optical axis of a camera, selecting at least two test regions on the end face of the fiber, adjusting the position of at least one of a camera, a lens and the length section of optical fiber to focus each of the test regions on the sensing surface of the camera, and comparing the adjustments performed in the preceding step for the two test regions respectively.

In accordance with a second aspect of the present invention, apparatus for testing a length section of optical fiber in order to determine whether the angle between an end face of the length section and a plane perpendicular to a longitudinal axis of the length section of optical fiber is within a predetermined range, comprises a camera and means for positioning the length section of optical fiber so that its longitudinal axis substantially coincides with the optical axis of the camera, whereby the camera acquires an image of the end face of the length section of optical fiber. The apparatus also comprises means for displacing the length section of optical fiber relative to the camera along an axis that substantially coincides with the longitudinal axis of the length section of optical fiber, means for storing at least one image acquired by the camera, and means for analyzing the stored image by selecting at last two test regions of the end face of the fiber, adjusting the position of the length section of optical fiber along the optical axis of the camera to focus each of the test regions on the sensing surface of the camera, and comparing the adjustments performed in the preceding step for the two test regions respectively.

BRIEF DESCRIPTION OF THE DRAWINGS

For a better understanding of the invention, and to show how the same may be carried into effect, reference will now been made, by way of example, to the accompanying drawings in which.

DETAILED A DESCRIPTION

Figure 1:
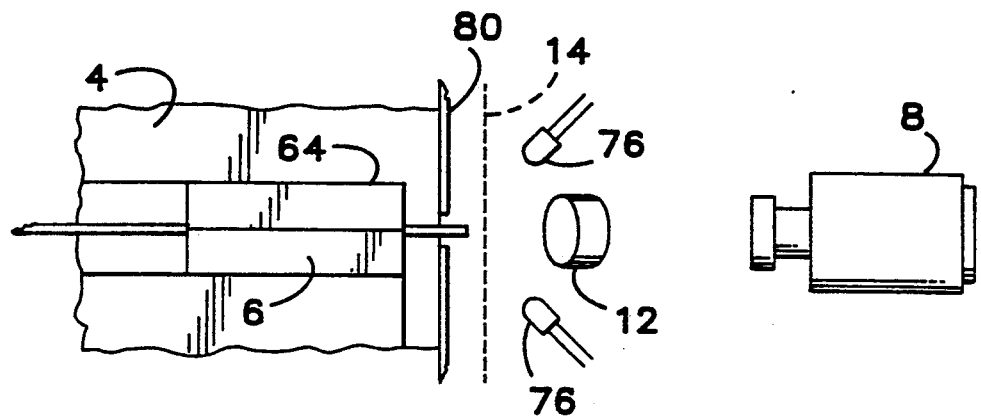
FIG. 1 is a simplified top plan view of the optical and mechanical components of a geometry measuring machine.
Figure 2:
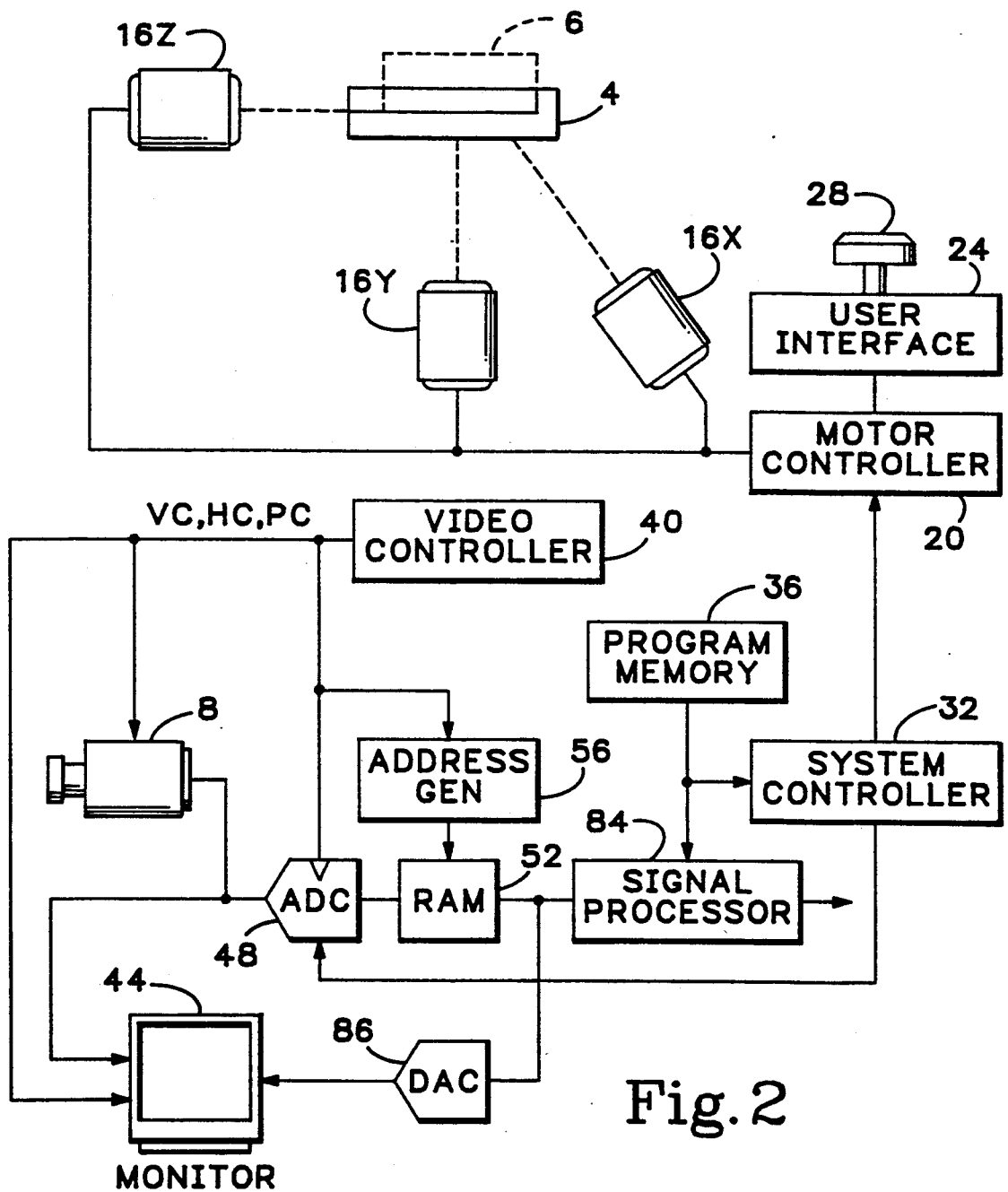
FIG. 2 is a block diagram illustrating a processing circuit that forms part of the geometry measuring machine.

The geometry measuring machine shown in FIGS. 1 and 2 comprises a stage 4 for receiving a clamp 6 that is designed to hold an end region of an optical fiber under test, a CCD camera 8 and optics 12 for imaging a field of view on the sensing surface of the CCD camera. The field of view lies in a plane 14 that is perpendicular to the axis of optics 12. Referring to FIG. 2, stage 4 is movable under control of three stepper motors 16X, 16Y and 16Z. Motor 16X controls movement of stage 4 along a horizontal axis that is perpendicular to the axis of optics 12, motor 16Y controls movement along a vertical axis and motor 16Z controls movement along the axis of optics 12. Stepper motors 16 operate in response to pulses received from a motor controller 20. In a manual mode of operation, the user selects one of the stepper motors 16 at a user interface 24 and motor controller 20 supplies pulses to the selected motor in response to rotation of a manual control knob 28. In an automatic mode, motor controller 20 selects a motor and supplies pulses to the selected motor in response to commands received from a system controller 32 operating under control of a program stored in a program memory 36.

The sensing surface of camera 8 is composed of a rectangular array of sensing elements, each of which accumulates photoelectric charge at a rate dependent on the intensity with which light is incident thereon. There are 480 sensing elements in each vertical column and 512 elements in each horizontal row. The field of view of the camera is approximately 150 microns in the vertical direction and 200 microns in the horizontal direction. Camera 8 therefore resolves its field of view into 245,760 pixels, each pixel being about 0.31 microns high and 0.39 microns wide.

Referring to FIG. 2, camera 8 operates under control of clock signals generated by a video controller 40. Video controller 40 generates a vertical clock VC, a horizontal clock HC and a pixel clock PC. In response to a vertical clock VC, camera 8 initiates read-out of charge packets accumulated in its sensing elements, and in response to horizontal clock HC camera 8 enables the next horizontal row of sensing elements. The charge packets accumulated in the sensing elements of the row are shifted out in response to pixel clock PC. The sequence of charge packets forms a video signal, which is applied to a video monitor 44. Monitor 44 provides an image of at least part of the field of view of camera 8. The output signal of camera 8 is also applied to an analog-to-digital converter (ADC) 48, which, when enabled by system controller 32, samples the analog video signal under control of a sampling clock that is synchronous with pixel clock PC and converts each sample to digital form. The resulting digital signal is loaded into random access memory (RAM) 52 under control of row and column address signals generated by an address generator 56 in response to signals that are synchronous with pixel clock PC and horizontal clock HC. RAM 52 is able to store twenty-one frames of the output signal of camera 8.

Figure 3:
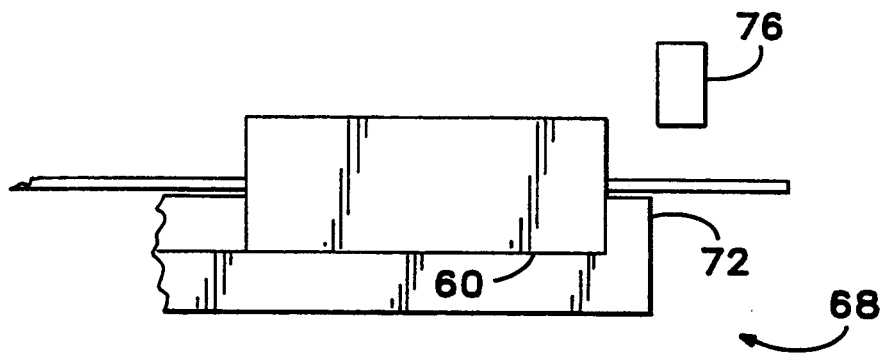
FIG. 3 illustrates an optical fiber cleaving device.

In order to measure the geometry of an optical fiber using the machine shown in FIGS. 1 and 2, the buffer layer is first removed from an end region of the fiber so as to expose the cladding over a length of about 7 cm. The end region of the fiber is then fitted into clamp 6, which may be of known construction, so that about 2 cm of fiber projects from the clamp. The clamp defines a channel so that the longitudinal axis of the segment of fiber that is within the clamp is substantially parallel to bottom and side reference surfaces 60, 64 of clamp 6. The clamp is placed in a cleaving device 68 (FIG. 3). The cleaving device may be of known construction and is designed to hold the clamp in a predetermined orientation. When the clamp is fitted in the cleaving device, the projecting end of the fiber extends over one blade 72 of a shear. The other blade 76 of the shear is then actuated, and the fiber is cleaved about 0.56 cm from the clamp. The cleave is substantially planar and is approximately perpendicular to the longitudinal axis of the fiber. Clamp 6 is placed on stage 4 with its reference surfaces engaging surfaces of stage 4 that are parallel to the XZ plane and the YZ plane respectively, so that the longitudinal axis of the fiber is substantially parallel to the Z-axis and the end face of the fiber under test is in a plane that is substantially parallel to plane 14. The end face of the fiber is back illuminated by LEDs 76 illuminating a diffusely reflecting screen 80 through which the fiber projects.

When clamp 6 has been mounted on stage 4, the manual mode of operation is invoked and manual control knob 28 is used to cause motor controller 20 to apply pulses to motors 16 so as to place the center of the end face of the fiber under test substantially on the axis of optics 12 and bring the image displayed on monitor 44 into focus. This condition can be readily determined, because under back illumination the periphery of the end face is imaged as a bright ring. The end face of the fiber under test then lies substantially in plane 14. However, because the end face is not necessarily precisely perpendicular to the longitudinal axis of the fiber segment, the end face might not lie precisely in the plane 14. The user then invokes the automatic mode, and system controller 32 applies pulses to motor 16Z to move stage 4 through a range of ±15 microns from its initial position (Z=0) in steps of 1.5 microns. At each of twenty-one positions of stage 4, a frame of the video signal provided by video camera 8 is digitized by ADC 48 and is loaded into RAM 52. In this fashion, twenty-one images of the field of view of camera 8 are acquired and stored.

The images stored in RAM 52 represent the spatial distribution of intensity I over the field of view of camera 8, and are analyzed by a signal processor 84 acting under control of a program stored in program memory 36. Signal processor 84 first determines the location of the center of the fiber, which is assumed to be circular, in the image for Z=0. This is accomplished by reading the vales of I from row 240 of the image, differentiating these values of I with respect to X, determining the value of X in the range X=0 to X=256 for which dI/dX is a maximum, determining the value of X in the range X=257 to X=512 for which dI/dX is a maximum, calculating the mean $X_o$ of the these two values of X, reading out the values of I for the column $X_o$, differentiating these values of I with respect to Y, determining the value of Y in the range Y=0 to Y=240 for which dI/dY is maximum, determining the value of Y in the range Y=241 to Y=480 for which dI/dX is a maximum, and calculating the mean $Y_o$ of these two values. The center of the fiber is at approximately the location $(X_o, Y_o)$. The radius R of the fiber is assumed to be equal to one half the difference between the two values of Y that are averaged to return $Y_o$.

Signal processor 84 then calculates the coordinates of eight points that lie on a circle of radius R and having its center at $(X_o, Y_o)$. These points are $(X_o, Y_o \pm R)$, $(X_o \pm R, Y_o)$, and $(X_o \pm (\sqrt{2}/2) R, Y_o \pm (\sqrt{2}/2) R)$.

For each of the twenty-one images, signal processor 84 then reads the values of I over six intervals of X, centered on the points $(X_o \pm R, Y_o)$ and $(X_o \pm (\sqrt{2}/2) R, Y_o \pm (\sqrt{2}/2) R)$, and two intervals of Y, centered on the points $(X_o, Y_o \pm R)$. The length of the intervals is sufficient to be sure that each interval spans the periphery of the end face of the fiber, taking account of the degree to which the fiber might be expected to be non-circular. Signal processor 84 differentiates values of I with respect to X over each of the six intervals of X by fitting the values of I for each set of seven adjacent points in the interval to a second order polynomial and calculating the value of dI/dX for that polynomial at the central point of the set. For each interval of X, signal processor 84 selects the maximum value of dI/dX. Similarly, signal processor 84 differentiates values of I with respect to Y over the two intervals of Y and, for each interval, selects the maximum value of dI/dY. Thus, for each of eight equiangularly spaced features at the periphery of the end face of the fiber, twenty-one values of dI/d(X, Y) are calculated. The particular image being processed is displayed on monitor 44 by use of a digital-to-analog converter 86 to convert the image to a video signal.

For each of the eight features, signal processor 84 determines which of the twenty-one values of dI/d(X, Y) is maximum and the value Zk (k=1...8) of Z with which this maximum value of dI/dR is associated. Signal processor 84 also determines the values of dI/d(X, Y) for Zk±1.5 microns and Zk±3.0 microns. Thus, five pairs of values of Z and dI/d(X, Y) are obtained for each of the eight features. The five pairs of values of Z and dI/d(X, Y) are fitted to the function $dI/d(X, Y) = AZ^2 + BZ + C$ using a least squares, or over-constrained, fit, and the value of Zmax k=2B/A is calculated. Assuming that the sharpness of the image formed on the sensing surface of camera 8 is a parabolic function of distance along the axis of optics 12, this value Zmax k represents the distance between plane 14 and the location along the Z-axis at which the kth feature on the periphery of the fiber is precisely imaged on the sensing surface of the camera. In general, eight different values of Zmax will be obtained, one for each of the eight peripheral features. Signal processor 84 calculates a value for the cleave end angle using these values of Zmax. It is seldom that the cleave will be planar, within measurement error, and therefore the nature of the calculation of cleave end angle can be somewhat arbitrary. For example, assuming that the eight features are at the periphery of a circle of radius R and centered on the Z axis, processor 84 might calculate a plane equation that optimally fits the eight values of Zmax and derive the cleave end angle from the coefficients of the plane equation.

Since the cleaving operation is likely to result in localized damage to the fiber it is desirable that no account should be taken of the value of Zmax for the feature affected by cleave damage. This can be achieved by forming eight sets of seven values of Zmax and deriving eight plane equations, and determining which of the eight equations has the maximum difference between the omitted value of Zmax and the value of Z given by the plane equation for the X and Y coordinates of the omitted feature. This equation is selected as the most accurate on the assumption that the large difference between the omitted value of Zmax and the value of Z given by the plane equation is due to damage to the fiber.

Another possibility would be to calculate a value of the cleave end angle for each of the eight features by assuming that the value $Z_o$ of Z at the center of the end face is equal to the mean of the eight values of Zmax and then calculating $$theta\ k = arc\ tan\ (Z_o - Zmax\ k)/R$$

The largest value of theta k may be discarded, to allow for damage to the fiber during cleaving.

When the geometry measuring machine has calculated the cleave end angle, the calculated value is compared with a reference value. If the calculated value is less than the reference value, it implies that the cleave is acceptable and further measurements may be made. For example, a more accurate measurement of fiber diameter may be made, or the roundness of the fiber may be measured. These measurements are made in similar fashion to the measurement of cleave end angle, i.e., by acquiring an image of the end face of the fiber and analyzing the image using signal processor 84. Thus, it is not necessary to provide a separate, dedicated device for measuring cleave end angle.

It will be appreciated that the invention is not restricted to the particular embodiment that has been described, and that variations may be made therein without departing from the scope of the invention as defined in the appended claims and equivalents thereof.

We claim:

1. A method of determining the orientation of an end face of a generally cylindrical member relative to a longitudinal axis of the cylindrical member, said method comprising the steps of:
   (a) positioning the cylindrical member so that the end face of the member confronts a probe device and is spaced from the probe device along said longitudinal axis,
   (b) selecting a region at the periphery of the end face of the cylindrical member,
   (c) employing the probe device to measure the distance along said longitudinal axis between the region selected in the preceding step and a reference plane perpendicular to said longitudinal axis,
   (d) selecting at least one additional region at the periphery of the end face of the cylindrical member,
   (e) repeating step (c), and
   (f) employing the distances measured in steps (c) and (e) to calculate a value of the angle between the end face of the cylindrical member and the longitudinal axis thereof.

2. A method according to claim 1, wherein the probe device is an optical imaging device having a sensing surface and step (c) comprises displacing the cylindrical member along its longitudinal axis and observing the position along said longitudinal axis at which the region selected in the preceding step is imaged most clearly by the imaging device.

3. A method according to claim 2, wherein step (c) comprises calculating the first derivative of intensity of the image with respect to distance along a line through the region selected in the preceding step and determining the position along the longitudinal axis for which the first derivative is a maximum.

4. A method according to claim 3, wherein step (c) comprises displacing the cylindrical member stepwise along the longitudinal axis to a plurality of discrete locations, acquiring and storing an image at each discrete location, and calculating the first derivative of intensity of each image with respect to distance along said line.

5. A method according to claim 1, wherein step (b) comprises the steps of locating a nominal center of the end face of the cylindrical member and selecting a region at a predetermined position relative to the nominal center.

6. A method according to claim 5, wherein the region selected in step (b) is at the periphery of the end face of the cylindrical member, step (d) comprises selecting at least two additional regions at the periphery of the end face of the cylindrical member, the regions selected in steps (b) and (d) being substantially equiangularly spaced about said nominal center, and step (e) comprises repeating step (c) for each region selected in step (d).

7. A method of testing a length section of optical fiber in order to determine whether the angle between an end face of the length section and a plane perpendicular to a longitudinal axis of the length section of optical fiber is within a predetermined range, said method comprising the steps of:
   (a) positioning the length section of optical fiber so that its longitudinal axis substantially coincides with the optical axis of a camera,
   (b) selecting two test regions on the end face of the fiber,
   (c) adjusting the position of at least one of a camera, a lens and the length section of optical fiber to focus each of the test regions on the sensing surface of the camera, and
   (d) comparing the adjustments performed in step (c) for the two test regions respectively.

8. A method according to claim 7, wherein step (c) comprises (i) moving the length section of optical fiber along the axis of the camera and (ii) determining the two positions along the optical axis at which the two test regions respectively are optimally imaged on the sensing surface of the camera.

9. A method according to claim 7, wherein step (c) comprises (i) moving the length section of optical fiber stepwise along the axis of the camera to a plurality of discrete positions, and (ii) determining the discrete positions for which the test regions are optimally imaged on the sensing surface.

10. A method according to claim 9, wherein step (c) (i) comprises, for each test region, (I) calculating the value of a parameter that represents the quality with which the test region is imaged on the sensing surface of the camera for each of the plurality of discrete positions, (II) determining which of the values calculated in step (I) is greatest, (III) determining the discrete position along the axis of the camera for which said parameter has the greatest value, (IV) determining the values of said parameter for at least two discrete positions adjacent the discrete position determined in step (III), and (V) calculating a value for the position at which an interpolated value of the parameter is a maximum.

11. A method according to claim 10, wherein the parameter whose value is calculated in step (I) is the first derivative of intensity of the image with respect to a spatial coordinate perpendicular to the longitudinal axis, and the value calculated in step (V) is the peak of a parabola fitted to the values of the parameter selected in steps (III) and (IV).

12. Apparatus for determining the orientation of an end face of a generally cylindrical member relative to a longitudinal axis of the cylindrical member, said apparatus comprising:

means for positioning the cylindrical member so that the end face of the member confronts a probe device and is spaced from the probe device along said longitudinal axis, and means for selecting at least two regions at the periphery of the end face of the cylindrical member, measuring the distance along said longitudinal axis between the selected regions and a reference plane perpendicular to said longitudinal axis, and comparing the distances measured.

13. Apparatus for testing a length section of optical fiber in order to determine whether the angle between an end face of the length section and a plane perpendicular to a longitudinal axis of the length section of optical fiber is within a predetermined range, said apparatus comprising:

a camera having a sensing surface, means for positioning the length section of optical fiber so that its longitudinal axis substantially coincides with the optical axis of the camera, whereby an image of the end face of the length section of optical fiber is formed on the camera's sensing surface, means for displacing the length section of optical fiber relative to the camera along an axis that substantially coincides with the longitudinal axis of the length section of optical fiber, means for storing images formed on the camera's sensing surface at a plurality of positions of the length section of optical fiber relative to the camera, and means for analyzing the stored images in accordance with the following steps:
(a) select at least two test regions of the end face of the fiber,
(b) for each test region, determine the position of the length section of optical fiber along the optical axis of the camera for which the test region is focused on the sensing surface of the camera, and
(c) compare the positions determined in step (b) for the test regions respectively.

14. A method according to claim 7, wherein step (b) comprises selecting at least one additional test region on the end face of the fiber and step (d) comprises comparing the adjustments performed in step (c) for the selected test regions respectively.

15. A method according to claim 1, further comprising:
(g) if the value of the angle calculated in step (f) lies within a predetermined range, measuring at least one additional geometric parameter of the end face of the cylindrical member.

16. A method according to claim 4, further comprising:
(g) if the value of the angle calculated in step (f) lies within a predetermined range, employing the images stored in step (c) to calculate the value of at least one parameter of the end face other than the angle between the end face of the cylindrical member and the longitudinal axis thereof.

17. A method according to claim 7, further comprising:
(e) if the angle between the end face of the length section and the plane perpendicular to the longitudinal axis of the length section is within said predetermined range, measuring at least one parameter of the end face of the length section other than the angle between the end face of the length section and the plane perpendicular to the longitudinal axis of the length section.

18. Apparatus according to claim 13, wherein the means for analyzing the stored images additionally:
(d) measure at least one parameter of the end face of the length section other than the angle between the end face of the length section and the plane perpendicular to the longitudinal axis of the length section if the angle between the end face of the length section and the plane perpendicular to the longitudinal axis of the length section is within said predetermined range.

* * * * *